United States Patent

[11] 3,540,463

| [72] | Inventor | Arthur S. Meyer<br>West Chester, Ohio |
|---|---|---|
| [21] | Appl. No. | 762,208 |
| [22] | Filed | Sept. 16, 1968 |
| [45] | Patented | Nov. 17, 1970 |
| [73] | Assignee | General Electric Company<br>a corporation of New York |

[54] FLUIDIC DEVICES WITH IMPROVED TEMPERATURE CHARACTERISTICS
8 Claims, 4 Drawing Figs.

[52] U.S. Cl.............................................. 137/81.5,
137/468, 239/265.43
[51] Int. Cl............................................. F15c 3/10,
F16k 17/38
[50] Field of Search........................................ 137/81.5,
79, 80, 83, 90, 468; 239/265.43, 265.23, 534

[56] References Cited
UNITED STATES PATENTS
| 3,276,727 | 10/1966 | Clark............................ | 137/468X |
| 3,182,686 | 5/1965 | Zilberfarb..................... | 137/81.5X |
| 3,266,511 | 8/1966 | Turick.......................... | 137/81.5 |
| 3,267,946 | 8/1966 | Adams et al.................. | 137/81.5 |
| 3,330,483 | 7/1967 | Lewis........................... | 137/81.5X |
| 3,417,813 | 12/1968 | Perry............................ | 137/81.5X |

*Primary Examiner*—William R. Cline
*Attorney*—Derek P. Lawrence, Lee H. Sachs, Frank L. Neuhauser, Oscar B. Waddell, Thomas J. Bird, Jr. and Joseph B. Forman ABSTRACT: The disclosure illustrates three forms of fluidic devices wherein the discharge areas or entrance areas for fluid passageways are varied by bimetallic strips to render the functioning of the devices essentially, if not entirely, insensitive to changes in temperature of the motive fluids employed in the devices. An alternate embodiment of the invention illustrates a fluidic device wherein the discharge end of a power stream nozzle is formed by bimetallic strips which flex to produce a pressure output signal, at receiver means downstream thereof, indicative of the temperature of the fluid stream discharged from the nozzle.

Patented Nov. 17, 1970 3,540,463

INVENTOR.
ARTHUR S. MEYER
BY

Patented Nov. 17, 1970

INVENTOR.
ARTHUR S. MEYER
BY

FLUIDIC DEVICES WITH IMPROVED TEMPERATURE CHARACTERISTICS

The present invention relates to improvements in fluidic devices and, more particularly, to improvements in the temperature characteristics of such devices.

Fluidic devices are now well known as a means for providing control functions for moving fluid streams. These devices have in common a pressurized fluid source which is varied relative to an output in performing a control function. Changes in temperature of the fluid medium passing through such fluidic devices and/or changes in temperature of the device itself to a greater or lesser extent affect the operating characteristics of the device. In many instances, temperature effects degrade the accuracy which would normally be achievable under constant temperature conditions. More specifically, in either the so-called proportional or digital type of fluidic amplifier, changes in fluid temperature, particularly where the fluid medium is a gas such as air, result in changes in the output pressure signals, and thus the output would reflect a nonexistent change in the signal input.

The obvious solution to such temperature problems is to maintain the fluidic devices in a controlled temperature atmosphere. However, this is impractical, if not impossible, in many operating environments. Other proposed solutions have included the use of various forms of compensating networks which add complexity to the fluidic system as well as requiring certain compromises in their total effectiveness in the overall system.

One object of the present invention is to minimize, if not eliminate, the effects of temperature changes on the operation of fluidic devices.

In a broader sense, it is an object of the invention to control the effects of temperature on the operation of a fluidic device in a predeterminable fashion.

Yet another object of the invention is to obtain a temperature indicating fluidic device through the use of controlled effects on its operation.

The above ends are broadly obtained, in a fluidic device having a fluid passageway, through the provision of a wall portion, at one end of the passageway; this wall portion is displaced by temperature-responsive means, as a function in the changes of the temperature environment of the device. This enables the discharge or entrance to the passageway to be controlled as a function of temperature.

One preferred form of the invention is embodied in an amplifier type fluidic device comprising a power nozzle from which a power stream is discharged toward receiver means downstream thereof. Control jets discharged from one or more control ports are effective on the power stream to vary the recovered pressure in the receiver means in performing a control or computing function. The discharge end of the power nozzle is defined by a pair of bimetallic elements, the ends of which spread apart with increasing temperature to maintain a constant mass flow discharge from the power nozzle as temperature varies. The effects of temperature variation thus have a minimal effect on the recovered pressure in the receiver means. Additionally, the control ports may also be defined by similar bimetallic elements so that the effectiveness of the control jets on the power stream is likewise unaffected by temperature variations. Further, the entrances to the receiver means can likewise be defined by bimetallic elements to additionally, or independently, lessen the effects of temperature.

Another embodiment of the invention is in a vortex amplifier wherein a control stream is introduced tangentially into a cylindrical chamber having an axial passageway and an offset passageway for the flow of fluid therethrough. The control fluid for this type of amplifier is introduced tangentially of the cylindrical chamber. Again, to provide temperature compensation or a controlled temperature control function, the discharge end of this control fluid inlet passageway is defined by a bimetallic element so that the effective outlet opening of the control passageway and the mass flow of control fluid can be regulated and preferably maintained constant.

Another embodiment of the invention is in a temperature sensing fluidic device wherein a power stream is discharged from a nozzle, the outer ends of which are defined by a pair of bimetallic elements which shift laterally to displace the power stream relative to the receiver means and vary the recovered output pressure in the receiver means as a function of temperature.

The above and other related objects and features of the invention will be apparent from a reading of the following description of the disclosure found in the accompanying drawings and the novelty thereof pointed out in the appended claims.

Figure 1:
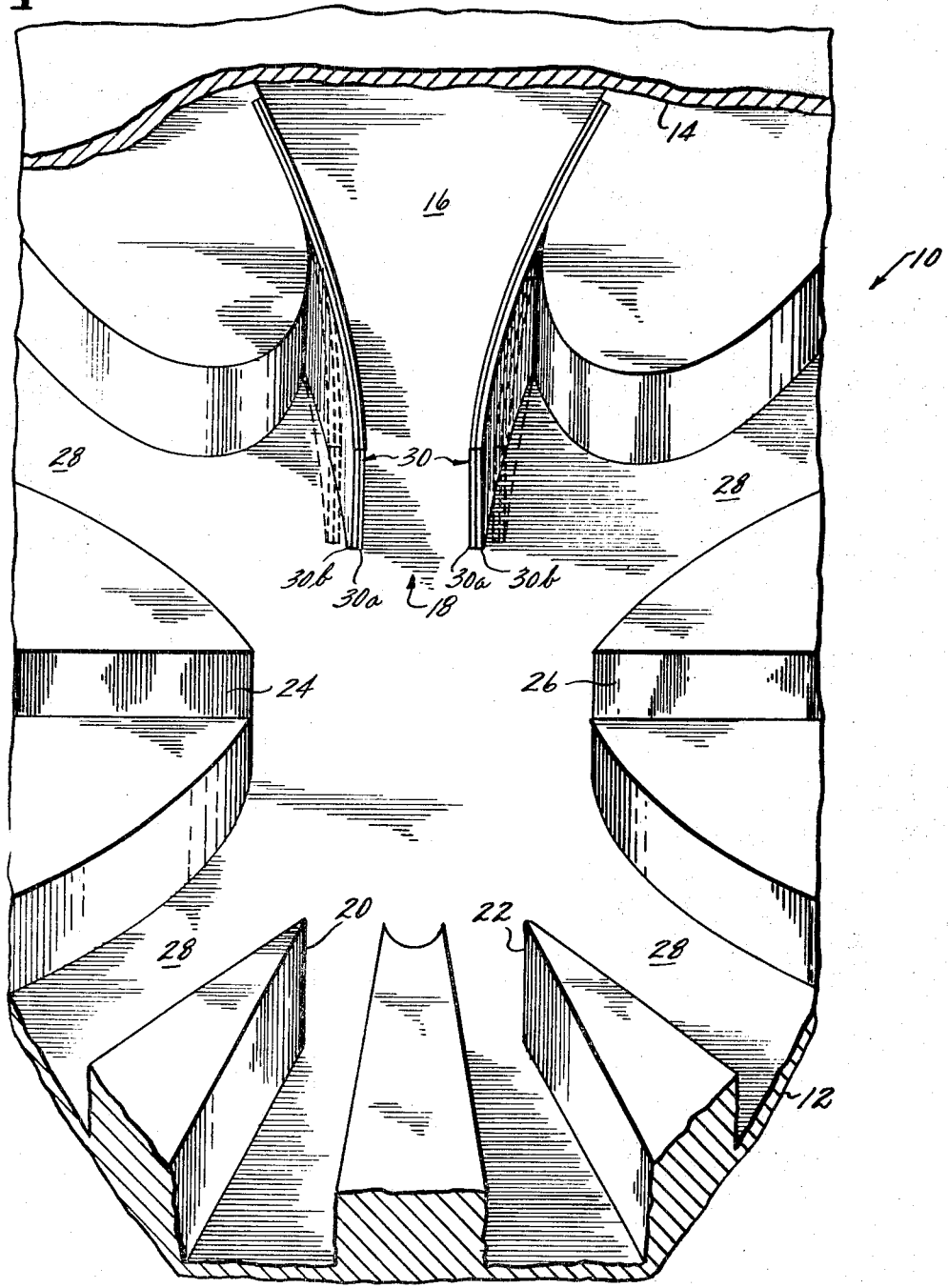
FIG. 1 is a perspective view of a fluidic device embodying the present invention.

For sake of illustration, the fluid amplifier 10 (FIG. 1) is shown as formed by a base plate 12 in which are formed several grooves. These grooves in the base plate 12, in combination with a cover plate 14 (most of which is broken away), define various fluid passageways hereinafter described.

The fluid amplifier 10 comprises a chamber 16 which is connected to a source of pressurized fluid for discharge of a power stream from a nozzle 18. The power stream is directed towards receiver passageways 20, 22 on opposite sides of the nominal flow path of the power stream. Intermediate the power stream nozzle 18 and receivers 20, 22 are a pair of control ports 24, 26 which direct fluid, control streams toward the power stream. The pressure differential between the control streams from the ports 24 and 26 causes the power stream to be deflected, whereby the recovered pressure in the receivers 20, 22 is a function of the deflection of the power stream, and such recovered pressures can then be used in many different ways well known to those skilled in the art. For greater accuracy of operation in such proportional amplifiers, venting passageways 28 are provided between each of the control ports 24, 26, and the power nozzle 18 and also the receivers 20, 22.

Up to this point, the description of the fluid amplifier 10 has referenced conventional portions thereof. The present invention is embodied in the construction of the power stream nozzle 18. From the drawing it will be apparent that the discharge end of this fluid passageway, i.e., the nozzle 18, is formed by opposed bimetallic strips 30 which are anchored at their upstream ends to the base plate 12. The downstream or outer ends actually defining the nozzle discharge portion of the passageway are formed by the free ends of these bimetallic strips. The free ends of the bimetallic strips are contiguous, at their top and bottom edges respectively, with the cover plate 14 and the bottom or lower wall surface of the base plate 12.

It will further be noted in FIG. 1 that the bimetallic elements 30 form a nozzle which is symmetrical relative to a center line about which the control ports 24, 26 and the receivers 20, 22 are also symmetrically disposed.

The bimetallic strips 30 may be of any well known construction comprising two elements, 30a, 30b, having different coefficients of thermal expansion and bonded together so that the strip will flex a predetermined amount as its temperature changes. In the case of the bimetallic strips 30, the elements 30a, forming the inner, or fluid flow-defining surfaces, have a greater coefficient of thermal expansion than that of the elements 30b, forming the outer portions of the strip. Preferably the respective materials and dimensions of the two strips 30 are identical so that when temperature changes occur, the free ends thereof, defining the nozzle discharge, will remain symmetrical relative to the center line of the fluid amplifier device.

From the above it will be apparent that as the temperature of the power stream changes, the discharge area of the nozzle 18 will change. More specifically, as the temperature increases, the discharge area of the nozzle will increase, as indicated by the dashed line position of the bimetallic strips seen in FIG. 1. Conversely, if the temperature decreases, the discharge area of the nozzle will likewise decrease. This enables a constant mass flow of fluid to be discharged from the nozzle 18 when the temperature of the power supply fluid medium varies. By maintaining a constant mass flow from the power nozzle, the recovered pressures in the receivers 20 and 22 are insensitive to any changes in the temperature of the power stream and reflect more accurately the pressure differential between the control ports 24 and 26.

The selection of materials for the bimetallic elements 30a, 30b and their dimensions is well within the capability of those skilled in the art to maintain a constant mass flow of the power stream over a given temperature range.

Figure 2:
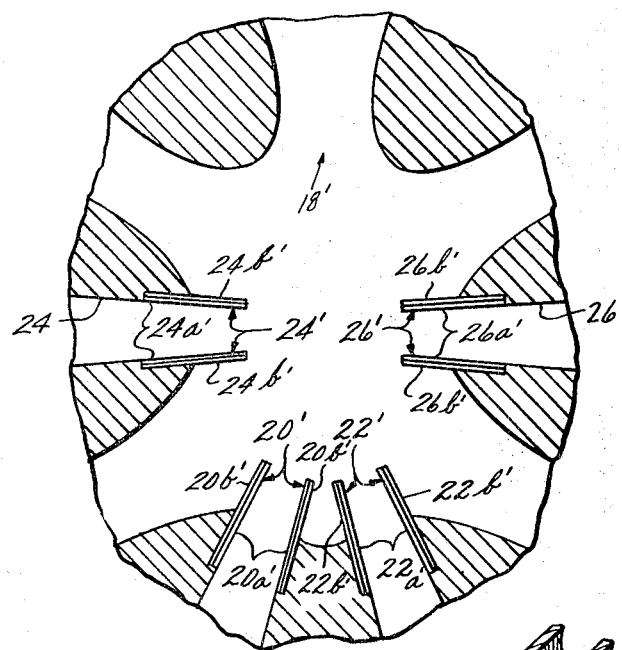
FIG. 2 is a view of another embodiment of the invention.

FIG. 2 illustrates another fluid amplifier embodying the present invention. This fluid amplifier comprises the same basic elements of a power stream nozzle 18′, receivers 20′ and 22′, and control ports 24′, 26′. The power stream nozzle 18′ is of fixed geometry, whereas the receiver ports 20, 22 are respectively defined at their entrance ends by bimetallic strips 20′, 22′. The inner or opposed surfaces of the strips 20′, 22′ are formed by elements 20a′, 22a′, having a greater coefficient of expansion than elements 20b′, 22b′, forming their outer surfaces. Thus, as the temperature of the power stream increases, the entrances to the receivers increase correspondingly so that the recovered pressure therein is unaffected, or substantially unaffected, by the change in mass flow rate from the nozzle 18′. Conversely, again, if the temperature of the power stream should decrease, the free ends of the bimetallic strips 20′, 22′ would respectively move towards each other, decreasing the entrances to the receivers 20, 22, maintaining the recovered output pressures thereof unchanged in the event of a decrease in the power stream temperature.

FIG. 2 also illustrates that the discharge portions of the control ports 24, 26 may be defined by bimetallic strips 24′, 26′. The discharge areas of the control ports are thus varied, as a function of the temperature of the fluid control streams discharged therefrom. The bimetallic strips 24′, 26′ again are anchored at their upstream ends and their free ends are movable towards and away from each other in a symmetrical fashion, in the same fashion as described previously. Proper selection of materials for the bimetallic strip elements 24a′, 24b′, 26a′, 26b′, as taught above, provides a constant mass flow of fluid discharge.

FIGS. 1 and 2 have illustrated the use of the present invention in a proportional-type fluidic device wherein the output, as reflected by the recovered pressures in the receivers 20, 22 is proportional to the pressure differential between the control ports 24, 26. The same advantages herein described and their application to digital type fluidic devices operating on the wall attachment effect, or Coanda effect, will be readily apparent to those skilled in the art.

Figure 3:
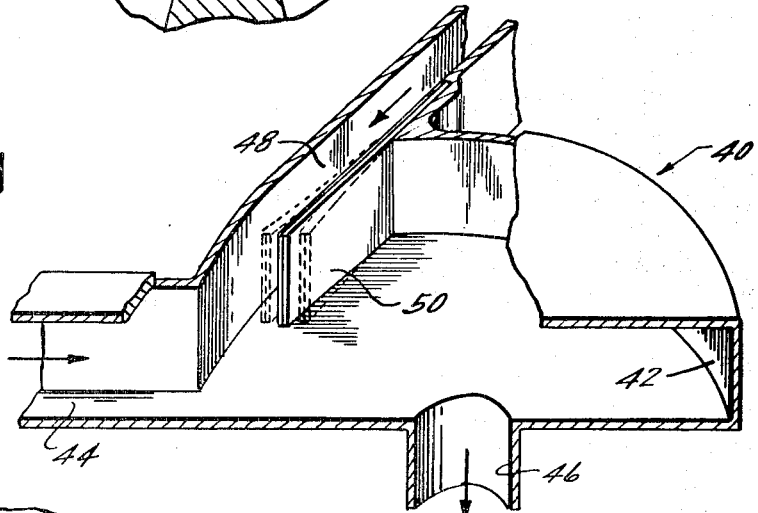
FIG. 3 is a perspective view of another embodiment of the invention.

FIG. 3 illustrates the advantages of the present invention in a different type of fluidic device commonly referred to as a vortex fluid amplifier. The vortex fluid amplifier, which is sometimes utilized as a fluidic or flueric valve, comprises a cylindrical chamber 42, having a fluid flow entrance passage 44, which is usually oriented radially of the cylindrical chamber, and an exit or discharge passageway 46, which is usually disposed coaxially of the chamber 42. A control passageway 48 is disposed tangentially of the chamber 42. The control stream discharged from the passageway 48 regulates the amount of flow of fluid that will be admitted to the chamber 42 from the inlet 44. This regulation will be a function of the pressure or flow rate of fluid discharged from the control passageway 48. A relatively small flow of control fluid from passageway 48 will provide regulation for much larger fluid flows and pressures of fluid through the inlet passageway 44.

The discharge end of the control passageway 48 is again defined by a bimetallic strip 50 which is anchored at its upstream end and movable, between the top and bottom walls of the chamber 44, towards and away from the outer wall of the chamber 42 so as to vary the discharge area of the control passageway 48 as a function of the temperature of the fluid. In this fashion and in accordance with the more detailed description above, the mass flow of fluid from the control passageway 48 may be maintained constant over a substantial temperature range so that the functioning of the device is essentially, if not entirely, insensitive to the temperature of the motive fluid.

Figure 4:
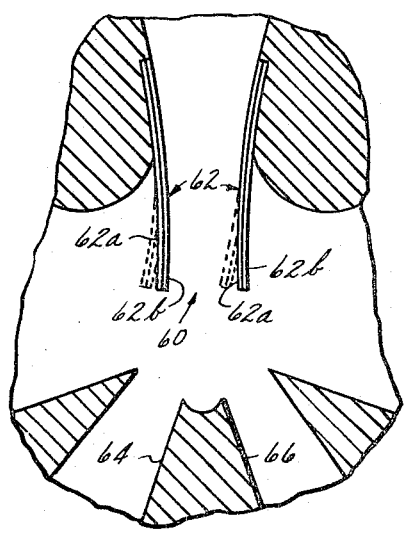
FIG. 4 is a view of a temperature sensing device embodying the present invention.

FIG. 4 illustrates an alternative embodiment of the present invention comprising a power stream nozzle 60 and receivers 64, 66. The discharge end of the power stream nozzle 60 is defined by bimetallic strips 62 in the same general fashion as the nozzle 18 of FIG. 1. The bimetallic strips are respectively formed of elements 62a, 62b. The elements 62a have a greater coefficient of thermal expansion than the elements 62b. By having the elements 62a and 62b define opposite sides of the nozzle 62 will flex in the same direction, as illustrated by the dashed lines in FIG. 4, when there are changes in the temperature of the power stream fluid. Thus, the discharge end of the nozzle is displaced as a function of the temperature of the fluid. When such displacement occurs, a change in the differential between the recovered pressures in the receivers 64, 66 results. The differential recovered pressure between the receivers 64, 66 represents the temperature of the fluid stream discharged from the nozzle 60. By proper selection of the materials and dimensions of the strips 62, it is possible to obtain a linear change in this pressure differential over a substantial temperature range. Such a linear output signal reflecting temperature provides a fluid pressure signal which has many utilities in various fluidic control circuits.

The described device also provides a means for determining whether a sensed temperature is above or below a given value in that there will be a fixed temperature at which the strips 62 center the power stream relative to the receivers 64, 66, and the recovered pressures in the receivers 64, 66 are equal. If the reference temperature is exceeded, the recovered pressure in one receiver will be greater than the other. If the fluid temperature is less than this reference temperature, the recovered pressure in the opposite receiver will be higher.

The described use of bimetallic strips is preferred in that they give a rapid response to changes in fluid temperature, minimizing any transient temperature effects on the output of the fluidic devices. However, in the broader aspects of the invention, other constructions and advantages for the benefits of the present invention will be apparent to those skilled in the art, and the scope of the inventive concepts is, therefore, to be derived solely from the appended claims.

Having thus described the invention, what is claimed as novel and desired to be secured by Letters Patent of the United States is:

I claim:

1. A fluidic device comprising a fluid passageway having an end portion, and means defining said end portion, at least a portion of said means being displaceable in direct response to changes in the temperature of the fluid passing through said passageway in a manner which does not materially affect the direction of the fluid passing through said passageway and also maintains the mass flow rate of the fluid passing through said passageway essentially constant, whereby the operating characteristics of the device are essentially unaffected by variation in the fluid temperature.

2. A fluidic device as in claim 1 wherein, the fluid passageway is a nozzle through which the motive fluid for the fluidic device is discharged.

3. A fluidic device as in claim 2, further comprising, receiver passageway means downstream of said nozzle for providing an output from said device.

4. A fluidic device as in claim 3, wherein the receiver means are disposed symmetrically relative to said nozzle and further comprising:

at least one control port adapted to discharge a fluid stream toward the fluid stream discharged from said nozzle to thereby control the output from said receiver means, and further wherein;

the means directly responsive to fluid temperature comprises a pair of bimetallic strips having their upstream ends fixed and their downstream ends free for displacement to vary the discharge area from said nozzle; and the relative coefficients of thermal expansion of said bimetallic element materials being responsive to temperature changes to flex the free ends thereof toward each other as temperature decreases and away from each other as temperature increases in predetermined relation, maintaining a constant mass flow of fluid discharged by said nozzle.

5. A fluidic device as in claim 4 in which each control port is defined by bimetallic elements having the same characteristics as the bimetallic elements defining the discharge end of said nozzle, whereby changes in temperature in the control stream passing through said ports does not affect the output characteristics of said fluidic device.

6. A fluidic device as in claim 4 wherein:

the receiver means comprise at least one fluid passageway having an entrance end facing generally toward said power nozzle; and further wherein, a bimetallic element defines in part the entrance end of said receiver passageway, said bimetallic element being responsive to increases in temperature to increase the effective opening of the entrance and responsive to decreases in temperature to reduce the effective opening of said entrance, whereby the receiver means output is further unaffected by changes in temperature of the fluid.

7. A fluidic device as in claim 1 wherein the fluidic device is in the form of a vortex amplifier comprising a cylindrical chamber having an axial opening and an axially offset opening for the passage of motive fluid therethrough and said passageway is a control passageway, opening tangentially into said chamber.

8. A fluidic device as in claim 7 wherein, the means directly responsive to fluid temperature changes is a bimetallic element having its upstream end fixed and its downstream end free to flex toward and away from the cylindrical wall of said chamber and wherein the bimetallic element is responsive to increases in temperature to flex away from said wall and responsive to decreases in temperature to flex toward said wall and maintain a substantially constant mass flow discharge of control fluid into said chamber.